United States Patent
Kobayashi

(10) Patent No.: US 6,304,100 B1
(45) Date of Patent: Oct. 16, 2001

(54) PROGRAMMABLE SEMICONDUCTOR DEVICE PROVIDING SECURITY OF CIRCUIT INFORMATION

(75) Inventor: Naohiro Kobayashi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/428,051

(22) Filed: Oct. 27, 1999

(30) Foreign Application Priority Data

Apr. 27, 1999 (JP) .................................................. 11-119415

(51) Int. Cl.⁷ ............................. G06F 7/38; H03K 19/173
(52) U.S. Cl. ................................... 326/40; 326/46; 326/41
(58) Field of Search .................................. 326/38, 39, 40, 326/41, 46

(56) References Cited

U.S. PATENT DOCUMENTS

| | | |
|---|---|---|
| 4,933,898 | 6/1990 | Gilberg et al. . |
| 5,336,950 | 8/1994 | Popli et al. . |
| 5,349,249 | 9/1994 | Chiang et al. . |
| 5,367,207 | 11/1994 | Goetting et al. . |
| 5,689,195 * | 11/1997 | Cliff et al. ............................... 326/41 |
| 5,801,547 * | 9/1998 | Kean ......................................... 326/40 |
| 5,828,229 * | 10/1998 | Cliff et al. ............................... 326/40 |

FOREIGN PATENT DOCUMENTS

| | | |
|---|---|---|
| 2-232960 | 9/1990 | (JP) . |
| 4-114449 | 4/1992 | (JP) . |
| 5-267457 | 10/1993 | (JP) . |
| 6-224300 | 8/1994 | (JP) . |
| 7-37984 | 2/1995 | (JP) . |
| 8-501402 | 2/1996 | (JP) . |
| WO 88/0037 | 1/1988 | (WO) . |
| WO 94/01867 | 1/1994 | (WO) . |

OTHER PUBLICATIONS

Ngai et al., "A New Generation of ORCA FPGA with Enhanced Features and Performance", 1996, IEEE 1996 Custom Integrated Circuits Conference, pp. 247–250.*

* cited by examiner

Primary Examiner—Michael Tokar
Assistant Examiner—Daniel D. Chang
(74) Attorney, Agent, or Firm—McDermott, Will & Emery

(57) ABSTRACT

For each of a plurality of basic circuit regions arranged in an array, a holding circuit for holding write inhibit information is provided. A region to be used for the IP can arbitrarily be selected from the plurality of basic circuit regions for writing first circuit information. Therefore, after various IPs are written by the first writer, efficient use of the remaining basic circuit region by the user and writing of second circuit information are enabled while preventing access to the circuit information for the IP by the user.

11 Claims, 7 Drawing Sheets

PROGRAMMABLE SEMICONDUCTOR DEVICE PROVIDING SECURITY OF CIRCUIT INFORMATION

BACKGROUND OF THE INVENTION

1. Field of the Invention

The present invention relates to a semiconductor device, and more particularly to a programmable gate array capable of determining a function by externally applied data.

2. Description of the Background Art

In the electronic industry, it is becoming increasingly important that new products are developed in a shorter period of time. The increase in the function level and reduction in the size of the new products are essential to the development of the semiconductor device with an integrated circuit. Therefore, a semiconductor device which can be developed in a shorter period of time is desirable.

Recently, a FPGA (Field Programmable Gate Array) has become of major interest as a semiconductor device which can be developed in a short period of time. The FPGA is a semiconductor device which performs a prescribed operation as supplied in a preliminary provided internal circuit with data by a user.

Conventionally, an ASIC (Application Specific Integrated Circuit) such as a standard cell or gate array has generally been used to develop a large scale integration in a short period of time. However, in the ASIC, a mask must be changed to change the function and, a prescribed manufacturing process must be performed using the changed mask. Namely, with the ASIC, the function cannot be changed without a service of a semiconductor manufacturer. Therefore, there has been a need for a semiconductor device capable of more flexibly coping with the change. Recently, the FPGA can be provided with a large scale circuit and more often used for reducing the development period of the new products.

The FPGA includes a plurality of circuit blocks arranged in an array, around which interconnection regions are provided. Each circuit block is provided with a programmable element, the state of which determining a function of the circuit block. The programmable elements are also provided in the interconnection regions, the state of the programmable element determining a relation between the circuit blocks.

As the programmable element, a fuse, antifuse or the like is used, or a combination of a switching element and a volatile RAM or a non-volatile memory holding setting data controlling the switching element is used. In the case of the volatile RAM, the setting data is lost once the power is turned off, so that an ROM (Read Only Memory), PROM (Programmable ROM) or the like for holding the setting data is externally connected to the FPGA. Thus, every time the power is turned on, the setting data is transferred to the volatile RAM in the FPGA.

On the other hand, with the recent increase in the integration degree of the semiconductor devices, design properties are on sale as IPs (Intellectual Properties), which are data including circuit information, by a variety of IP vendors. Some IP vendors write their own IPs in the FPGAs for providing them to the user, so that the user can customize the portion other than the IP in the FPGA for use in accordance with a system. In most cases, the IP vendors desire that the setting data for the IP which is set in the FPGA should not be accessed by the user.

However, in the conventional FPGA, the setting data for the IP has disadvantageously been accessed by the user.

For example, for the FPGA externally provided with the ROM, another FPGA having the same function can readily be produced by copying a content stored in the ROM. In addition, data is transferred from the ROM to the FPGA through an interconnection when the power is turned on. As the interconnection can readily be probed, the setting data for the IP may disadvantageously be accessed.

On the other hand, for the FPGA internally provided with a non-volatile memory, data can be read or displayed by a hardware for a program as in the PROM for verification of a design specification or analyzing the operation. Namely, when the hardware for the program suited to the specification of the FPGA is used, the setting data including circuit information can readily be read and a FPGA having the same function is disadvantageously produced.

Therefore, recently even in some types of the FPGAs internally provided with the non-volatile memory, once the setting data including circuit information is written, the circuit information is protected against writing and reading, so that a copy thereof is not created.

In the FPGA, however, any additional setting data cannot be written by the user for providing a circuit for connection to its own system after the IP vendor writes the setting data for the IP so as to prevent access to the circuit information.

The scale of logic circuits which can be incorporated in the FPGA has been on the increase. Provision of several IPs on the scale of a microprocessor has become possible to form a system LSI (Large Scale Integration) with a FPGA of one chip. However, if the IPs of a single FPGA are provided by a plurality of vendors, it is difficult to write a plurality of IPs to the same FPGA while preventing unauthorized copying of the IPs.

SUMMARY OF THE INVENTION

An object of the present invention is to provide a programmable gate array which can be provided with a plurality of IPs in a single chip while ensuring security of an IP vendor.

In short, the present invention relates to a semiconductor device provided with first and second circuit regions. The first and second circuit regions have functions of performing logical operations in accordance with setting data when the setting data is externally applied. The first circuit region is used for a first data provider in which a first function is determined when the first data is applied and which maintains the first function. The second circuit region is used for a second data provider in which a second function is determined when the second data is applied and which maintains the second function.

According to another aspect of the present invention, a programmable semiconductor device is provided which has a plurality of circuit regions. The plurality of circuit regions are arranged in an array. Each circuit region has a function of performing a logical operation in accordance with setting data when the setting data is externally applied. Each circuit region has a non-volatile data holding circuit and a functional circuit performing the logical operation. The non-volatile data holding circuit holds rewritable setting data. The non-volatile holding circuit is initially in a writable state, and brought into a write inhibit state when a write inhibit selection signal is applied after application of the setting data. The functional circuit performs a logical operation in accordance with the setting data held by the non-volatile data holding circuit. The write inhibit selection signal can independently be applied to each of the plurality of circuit regions.

Therefore, a main advantage of the present invention is that the user can use a user circuit and an IP circuit in a single chip and the access to circuit information by the user is prevented, so that reduction in the size of the system and power consumption can be achieved.

Another advantage of the present invention is that a region used for the IP is arbitrarily selected from a plurality of basic circuit regions and a first circuit (a circuit which is used for the first time) data is written, whereby a floor plan with high performance can be implemented which enables efficient use of the basic circuit region.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
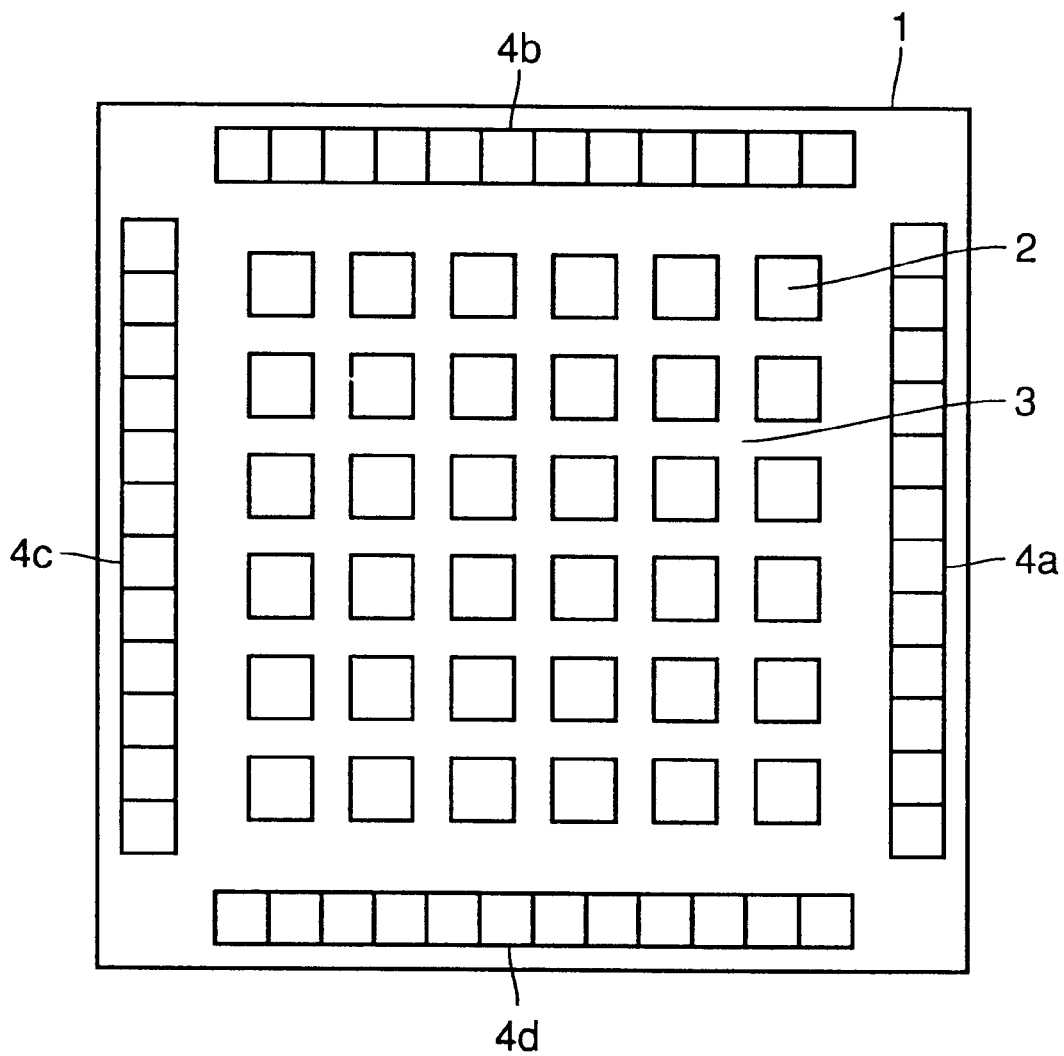
FIG. 1 is a schematic diagram showing an overall structure of a semiconductor device according to a first embodiment of the present invention.

The embodiments of the present invention will now be described in detail with reference to the drawings. It is noted that the same or corresponding portions are denoted by the same reference numerals in the drawings.

First Embodiment

Referring to FIG. 1, a semiconductor device 1 includes: a plurality of basic circuit regions 2 arranged in an array for maintaining a function of performing an operation in accordance with setting data when the setting data is externally applied; I/O regions 4a to 4d each having a plurality of input/output blocks in which an input/output specification is set by the externally applied setting data; and an interconnection region 3 surrounding a plurality of circuit regions 2.

I/O regions 4a to 4d are arranged at a periphery of a chip of semiconductor device 1, and serves as an interface between internally provided basic circuit region 2 and an outside. Input/output specifications of the plurality of input/output blocks included in I/O regions 4a to 4d can be determined by setting data. For example, each of the plurality of input/output blocks may be determined as a block for externally receiving an input signal, a block for externally outputting an output signal or a block for inputting/outputting a signal.

When the block is used for receiving the input signal, a threshold value of an input buffer can be selected from a plurality of values, a determination can be made as to if a flip-flop for input is provided, or a clock signal used for the flip-flop can be selected from a plurality of signals.

In an interconnection region 3, connecting lines are arranged both in rows and column directions. Each intersection of the connecting lines is provided with a switch. Inputs and outputs for basic circuit regions 2 and for I/O regions 4a to 4c are arbitrarily connected by programming a connection state of the switch by the setting data.

In the present invention, basic circuit region 2 has a distinctive characteristic.

Figure 2:
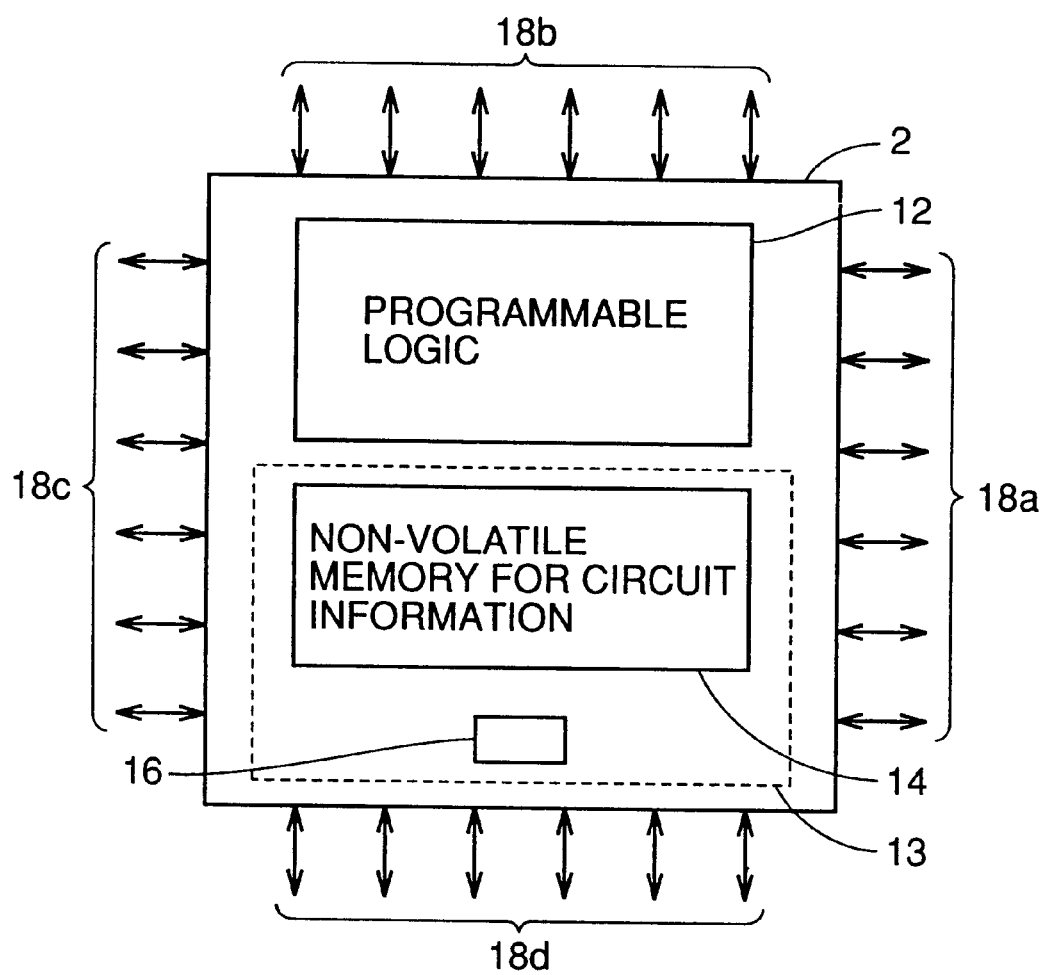
FIG. 2 is a diagram schematically showing a structure of a basic circuit region 2 shown in FIG. 1.

Referring to FIG. 2, basic circuit region 2 includes: inputs/outputs 18a and 18d for connection to connecting lines arranged in interconnection region 3 shown in FIG. 1; a non-volatile data holding circuit 13 to which circuit information is written by externally applied setting data and which holds the circuit information; and a programmable logic 12 having a function determined by the circuit information held by a non-volatile memory for circuit information 14 (hereinafter simply referred to as a non-volatile memory 14).

Non-volatile data holding circuit 13 includes: non-volatile memory 14 to which the circuit information is written by the externally applied setting data and which holds the circuit information; and a holding circuit 16 inhibiting external writing to non-volatile memory 14 and holding write inhibit information inhibiting external reading.

The above described structure enables holding of the write inhibit information for each of the plurality of basic circuit regions 2 arranged in the array shown in FIG. 1. As the write inhibit information is not set in holding circuit 16 in the initial state immediately after the manufacture of the FPGA, the first user of the FPGA can select a desired circuit region, write setting data and read the set data for verification. However, once the write inhibit information is set in the circuit region which has been used by the first user, the write inhibit information cannot be eliminated.

Therefore, the second user can utilize the circuit information written by the first user and set his or her own circuit information in the unused region to complete the FPGA as a system LSI, but cannot read the circuit information which has been written by the first user.

Figure 3:
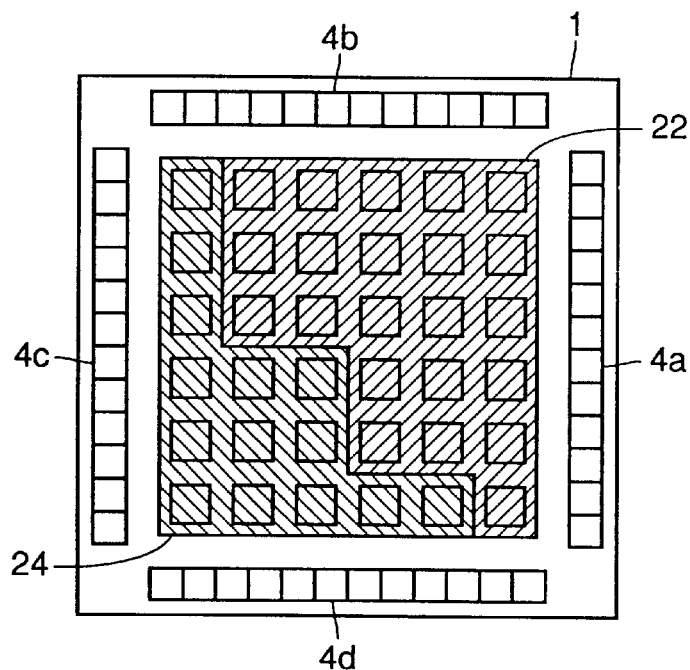
FIG. 3 is a diagram showing an exemplary application of the semiconductor device of the present invention.

Referring to FIG. 3, the IP vendor, the first writer for the FPGA, writes an IP circuit using a region 22 including a plurality of basic circuit regions. Then, write inhibit information is set in the basic circuit region included in the used region 22. The IP vendor ships the FPGA to the user with a specification related to the IP region which has been written by himself.

The user writes a desired user circuit information using the remaining region 24 of the received FPGA, so that the system LSI is completed. Thus, the user has no access to the circuit information of the IP, and the user and IP circuits can be integrated in a single FPGA.

As is apparent from a structure of the FPGA shown in FIG. 1, basic circuit regions 2 near the periphery of the chip can readily be connected to the I/O regions. Conversely, it is difficult to connect basic circuit regions 2 in the inner side of the chip to the I/O regions. Basic circuit regions 2 can more readily be connected to adjacent basic circuit regions 2 rather than the I/O regions.

The IP vendor, who is the first writer for the FPGA, determines the circuit region to be used in consideration of the above mentioned characteristic of the basic circuit regions, so that a floor plan for the high performance IP is achieved.

Figure 4:
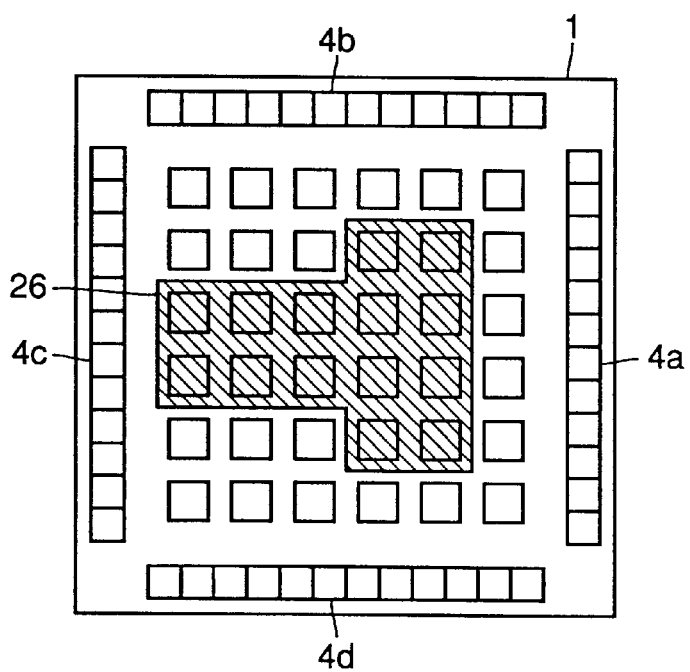
FIG. 4 is a diagram shown in conjunction with a state of an FPGA when an IP is written by an IP vendor, which IP is related to a large number of input/output signals for internal connection to a user circuit, but is related to few external input/output pins.

FIG. 4 is a diagram shown in conjunction with a state of an FPGA when an IP is written by an IP vendor, which IP is related to a large number of input/output signals for internal connection to a user circuit, but is related to a few external input/output pins. As described above, according to the semiconductor device of the first embodiment, the user can integrate the user and IP circuits in a single chip, and the IP vendor can prevent access to the circuit information by the user.

Therefore, as compared with a conventional system disadvantageously having a plurality of chips, the size and the number of input/output pins are reduced. Further, as a plurality of IPs are written in a single chip, even if the number of buses between the IPs is large, it is directly used as a system. In addition, the number of interconnections exposed to the outside is reduced and the number of output buffers driving the external interconnections with large parasitic capacitances is reduced. Thus, reduction in power consumption can be achieved.

The region to be used for the IP is arbitrarily selected from a plurality of basic circuit regions and the first circuit information is written. Thus, the floor plan with high performance enabling efficient use of the basic circuit region is achieved.

Second Embodiment

In the second embodiment, a more detailed structure for the basic circuit region shown in FIG. 2 will be described.

Basic circuit region 2a is an exemplary structure of basic circuit region 2 shown in FIG. 1.

Figure 5:
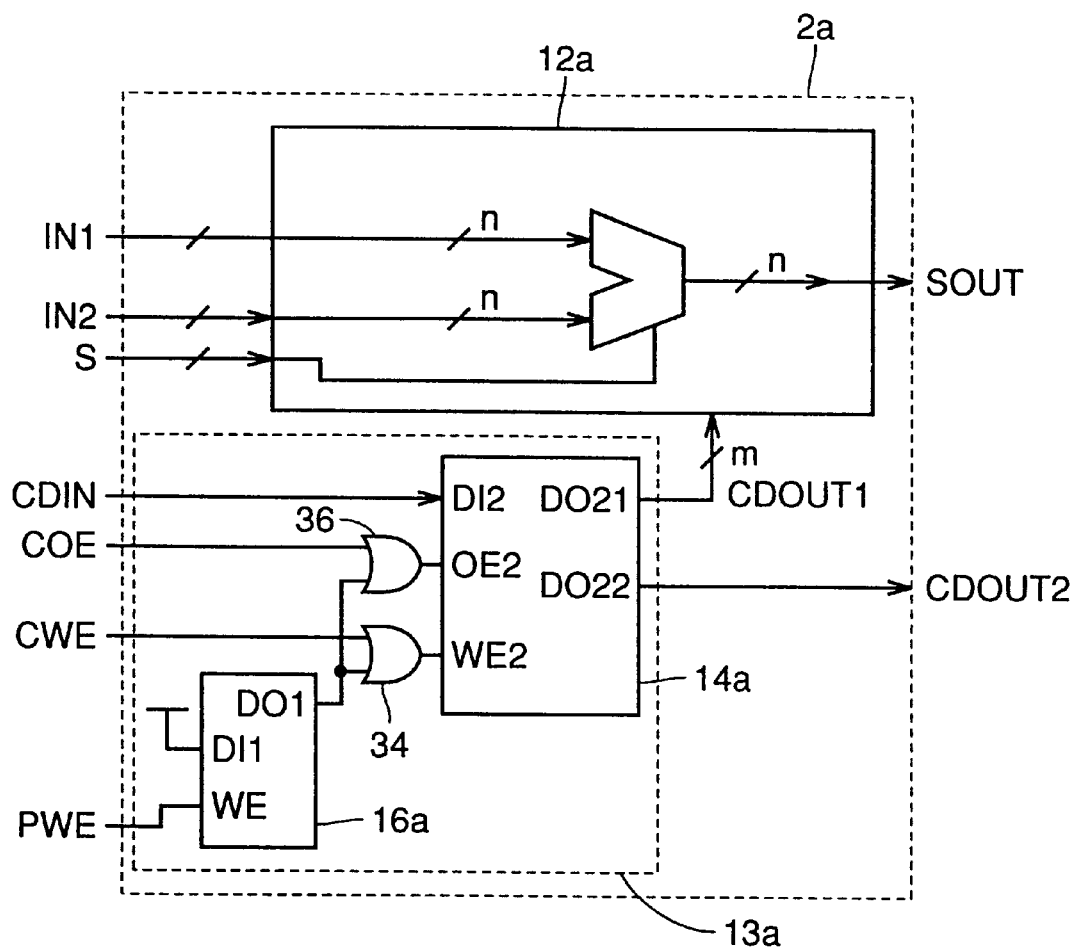
FIG. 5 is a diagram showing a structure of a basic circuit region 2a according to a second embodiment.

Referring to FIG. 5, basic circuit region 2a includes: a non-volatile data holding circuit 13a internally incorporating and holding a circuit data input signal CDIN in accordance with a circuit information write signal CWE; and a programmable logic 12a receiving a signal CDOUT1.

Programmable logic 12a includes a plurality of multiplexers controlled by each bit of signal CDOUT1, gates, 3-state buffers or the like, and performs a variety of functions in accordance with a value of signal CDOUT1. In FIG. 5, programmable logic 12a operates as a 2-input selector outputting one of two input signals IN1 and IN2 with n bits as a signal SOUT depending on a value of signal CDOUT1.

Non-volatile data holding circuit 13a includes: a protection memory 16a holding data at an L level in the initial state and receiving at an input node WE a protect signal PWE for incorporating data at an H level from an input node DI1 upon activation of protect signal PWE; and OR circuit 34 receiving a signal output from an output node DO1 of protection memory 16a and a circuit information write signal CWE; an OR circuit 36 receiving a signal output from output node DO1 of protection memory 16a and circuit information output enable signal COE; and a circuit information memory 14a for holding circuit information internally incorporating and holding circuit data input signal CDIN in accordance with outputs from OR circuits 34 and 36.

Protect circuit PWE can independently be applied to each of basic circuit regions. The writer who writes the setting data applies protect signal PWE only to the circuit region in which the confidential information for the plurality of basic circuit regions is to be held.

Circuit information memory 14a is a rewritable non-volatile memory. For example, a flash memory or the like is used. Circuit information memory 14a receives at input node WE2 an output from OR circuit 34, and receives at input node OE2 an output from OR circuit 36. Circuit information memory 14a internally incorporates and holds circuit data input signal CDIN when input node WE2 is set at the L level. Circuit information memory 14a outputs a circuit data signal, which has been internally incorporated and held, from output node DO22 as an output signal CDOUT2 when input node OE2 is set at the L level.

The circuit data signal which has been incorporated and held in circuit information memory 14a is output regardless of the setting condition of input node OE2 as signal CDOUT1 with m bits (where m is a natural number). Note that m corresponds to the number of data held in circuit information memory 14a.

Figure 6:
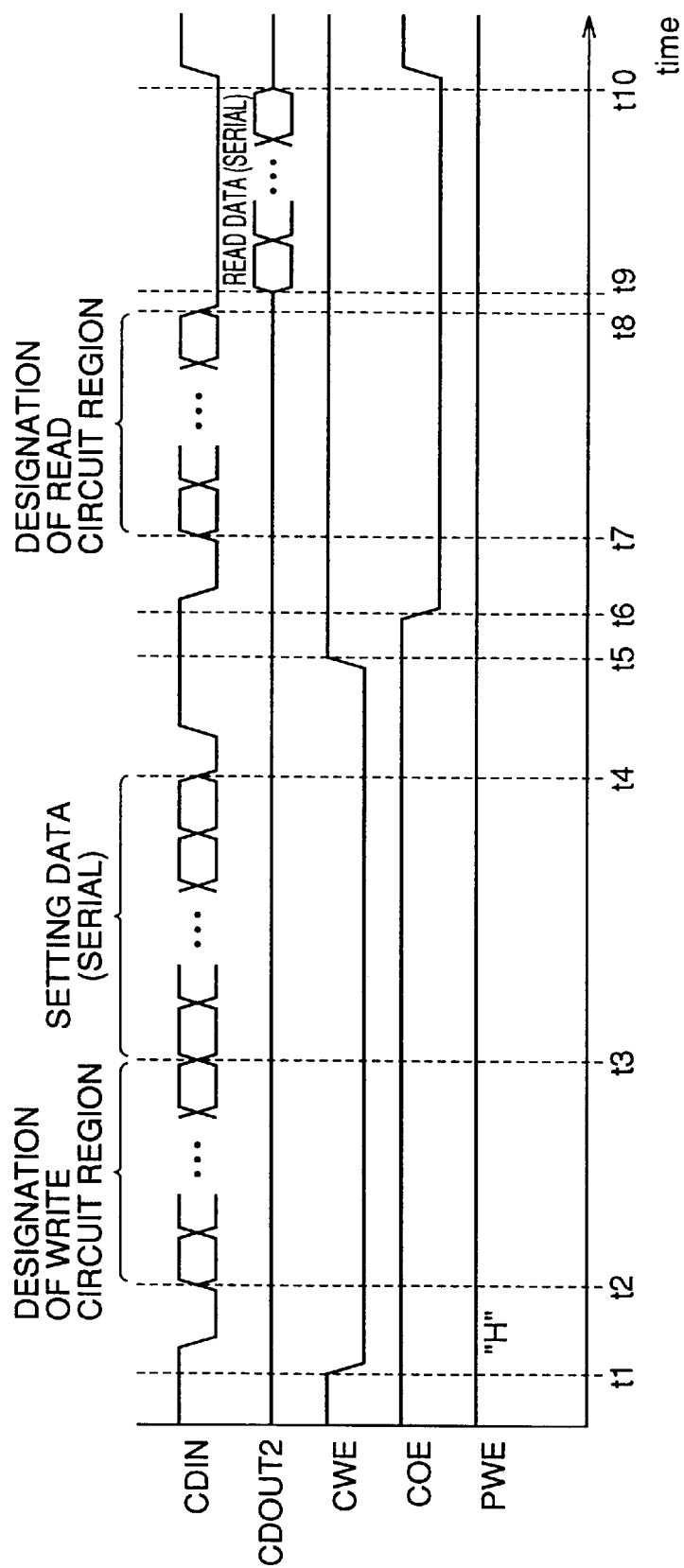
FIG. 6 is a diagram showing an operation waveform shown in conjunction with setting of the data to the basic circuit region shown in FIG. 5.

Referring to FIGS. 5 and 6, the case where protect signal PWE is set at the H level of the inactivation state will be described.

At a time t1, circuit information write signal CWE is set at the L level.

Thereafter, after a time t2, circuit data input signal CDIN is input to circuit information memory 14a. Circuit information memory 14a determines if circuit data input signal CDIN designates circuit information memory 14a itself or another basic circuit region by data input between times t2 and t3. Namely, information designating a write circuit region is applied as circuit data input signal CDIN between t2 and t3.

If circuit information memory 14a determines that it is designated, it receives a prescribed number of setting data and internally holds the same between t3 and t4. Circuit information memory 14a is a non-volatile memory, so that the held setting data would not be lost even if the power is turned off.

At t5, circuit information write signal CWE is set at the H level, and writing of the setting data is finished.

Thereafter, the setting data is read for verification of the written setting data. Such reading function is in most cases provided to ensure that data has been written to the non-volatile memory.

At t6, circuit information output enable signal COE is set at the L level, and reading of the circuit information is enabled.

Subsequently, between t7 and t8, information designating the read circuit region is applied as circuit data input signal CDIN.

Circuit information memory 14a externally outputs a prescribed number of setting data as output signal CDOUT2 between t9 and t10 upon detection of the fact that it is designated. By verifying output signal CDOUT2, a determination can be made if the data has surely been written.

It is noted that a reading operation after t6 may be performed independently of writing of the setting data between t1 and t5. Such reading operation is performed for verifying a specification of the FPGA by a writer himself or for copying the FPGA.

Next, the case where writing and reading are inhibited will be described.

Figure 7:
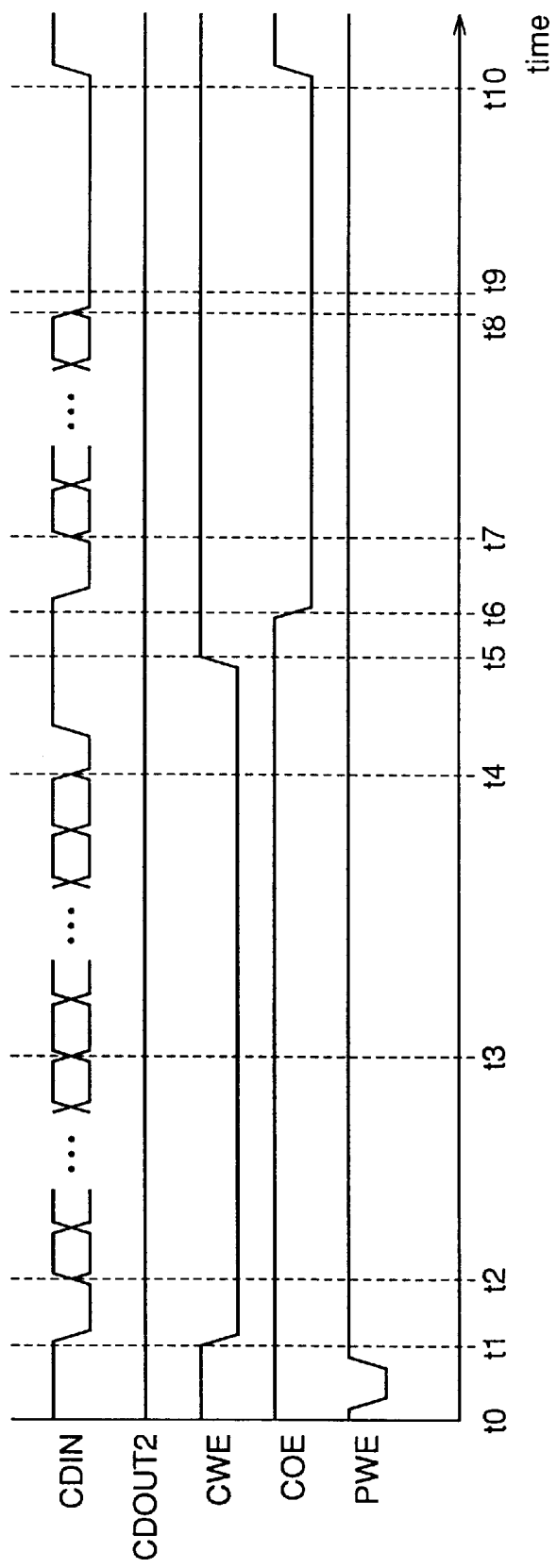
FIG. 7 is a diagram showing an operation waveform shown in conjunction with the case where setting of the data to the basic circuit region in FIG. 5 and data reading are inhibited.

Referring to FIGS. 5 and 7, between t0 and t1, protect signal PWE is set at the L level of the activation state. The activation of the protect signal is selectively performed for the basic circuit region to which data has been written. Thus, data at the H level, write inhibit information, is set in protection memory 16a. Once the data is set, it cannot be returned to the L level of the initial state.

At t1, circuit information write signal CWE is set at the L level.

Thereafter, circuit data input signal CDIN is input to circuit information memory 14a. Circuit information memory 14a determines if circuit data input signal CDIN designates circuit information memory 14a itself or another basic circuit region 2a by data input between t2 and t3. Namely, between t2 and t3, information designating the write circuit region is applied as circuit data input signal CDIN.

Although a prescribed number of setting data are applied as circuit data input signal CDIN between t3 and t4, memory for circuit information 14a does not accept writing of data as an output from OR circuit 34 is at the H level and applied to input node WE2 by write inhibit information set in protection memory 16a.

Therefore, the held setting data would not be lost by overwriting.

Then, at t5, circuit information write signal CWE is set at the H level, and writing of the setting data is finished.

Thereafter, the setting data is read for verification of the written setting data.

At t6, circuit information output enable signal COE is set at the L level, and reading of the circuit information is enabled.

Between t7 and t8, information designating the read circuit region is applied as circuit data input signal CDIN.

Generally, a prescribed number of held setting data are externally output as output signal CDOUT2 between t9 and t10. However, circuit information memory 14a does not accept output enable signal as an output from OR circuit 36 is at the H level and applied to input node OE2 by write inhibit information which has been set in protection memory 16a. Therefore, the held setting data would not be output as output signal CDOUT2. As a transition from reading enable state to reading inhibit state is irreversible, if a third party tries to read and analyze the setting data for the IP, reading thereof would extremely be difficult.

As described above, in the semiconductor device according to the second embodiment of the present invention, a region used for the IP can arbitrarily be selected from a plurality of basic circuit regions and writing of the first circuit data is performed, so that reading of the setting data from the basic circuit region with the written first circuit data can surely be inhibited. Therefore, the user can integrate the user circuit and IP circuit in a single chip, whereas the IP vendor can ensure security of the circuit information for the IP.

First Variation of Second Embodiment

Figure 8:
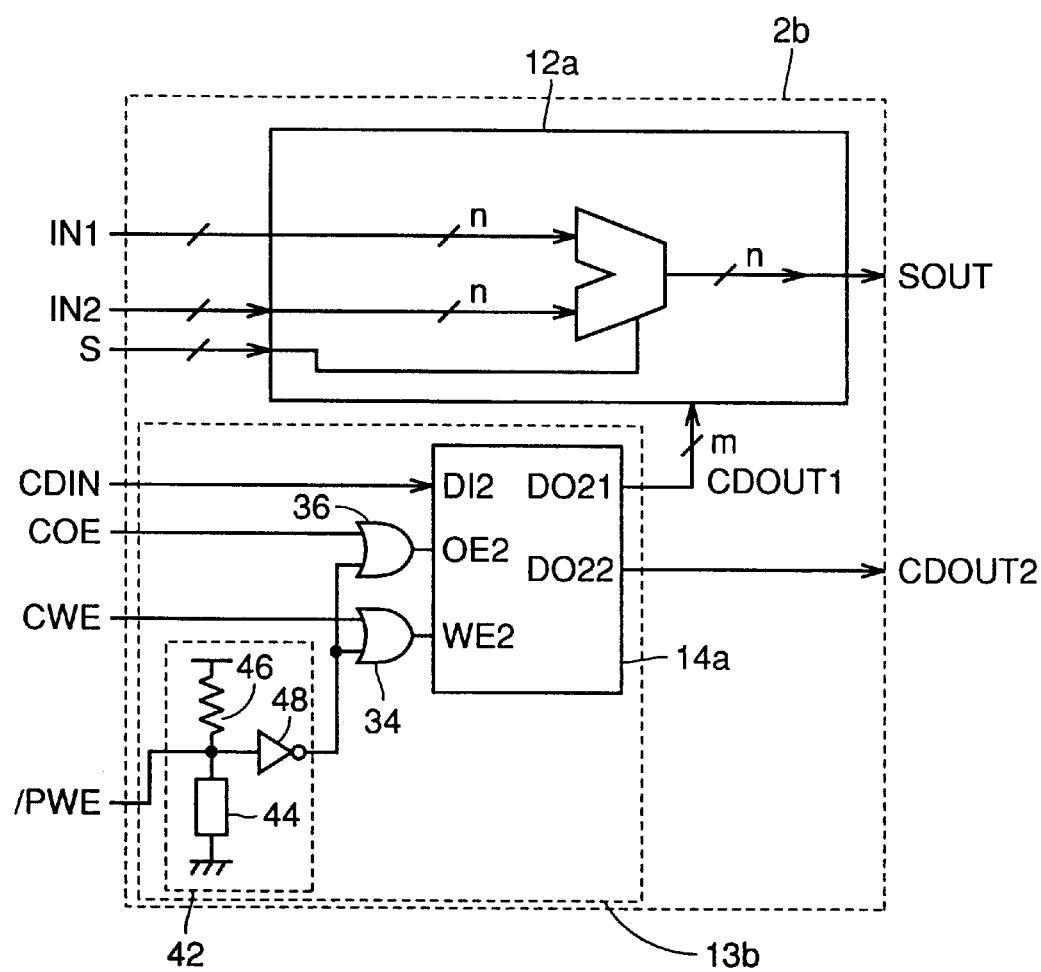
FIG. 8 is a circuit diagram showing a structure of a basic circuit region 2b according to a first variation of the second embodiment.

Referring to FIG. 8, basic circuit region 2b is different from basic circuit region 2a shown in FIG. 5 in that it includes non-volatile data holding circuit 13b in place of non-volatile data holding circuit 13a. Non-volatile data holding circuit 13b is different from non-volatile data holding circuit 13a shown in FIG. 5 in that it includes holding circuit 42 in place of protection memory 16a.

Holding circuit 42 includes: a resistor 46 having one end connected to a power supply node supplied with a power supply potential; an antifuse 44 provided between the other end of resistor 46 and a ground node; and an inverter 48 having an input node connected to the other end of resistor 46.

The other end resistor 46 is supplied with a protect signal /PWE.

As disclosed in Japanese Patent Laying-Open No. 7-37984, antifuse 44 is an element having a high resistance before programming and, when an appropriate voltages applied, comes to have a low resistance. The antifuse has a capacitor type structure and, for example, includes a thin insulating layer of silicon dioxide or the like between two conductive layers, for example, of aluminum. As such, it is a capacitor, i.e., an open circuit. However, when a high voltage is supplied for blowing, a conductive path is formed in the insulating layer, so that it becomes a resistance element having a resistance value of several k Ω.

Other parts of basic circuit region 2b are similar to those of basic circuit region 2a shown in FIG. 5, and therefore description thereof will not be repeated.

Now, setting of write inhibit information for basic circuit region 2b will be described.

Setting of the write inhibit information is performed by setting a potential difference between a potential of protect signal /PWE and a ground potential to at least 10V, for example. Thus, a potential difference of at least a normal power supply is applied between both ends of antifuse 44, so that a region between electrodes of antifuse 44 loses its insulating property and comes to have a resistance value lower than that of resistor 46. Therefore, after setting of the write inhibit information, the input node of inverter 48 attains to the L level, so that input nodes WE2 and OE2 of circuit information memory 14a are fixed at the H level. As a result, the setting data for circuit information memory 14a cannot be externally read as output signal ODOUT2.

It is noted that although the antifuse is used as an irreversible information holding element in the above described first variation of the second embodiment, a fuse element which is blown by application of a current may be used.

As described above, as in the semiconductor device according to the second embodiment, in the first variation of the second embodiment of the present invention, the region to be used for the IP is arbitrarily selected from a plurality of basic circuit regions for writing of the first circuit information, so that it is ensured that reading of the setting data from the basic circuit region with the written first circuit information is inhibited. Therefore, the user can integrate the user and the IP circuits in a single chip, whereas the IP vendor ensures security of the circuit information for the IP.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A programmable semiconductor device, comprising
   first and second circuit regions each having a function of performing a logical operation in accordance with setting data when said setting data is externally applied,
   said first circuit region being used for a first data provider and having a first function determined upon application of first data as said setting data and brought into a write inhibit state after application of said first data, and
   said second circuit region being used for a second data provider and having a second function determined upon application of second data as said setting data.

2. The semiconductor device according to claim 1, wherein
   said first circuit region includes
      a rewritable non-volatile data holding circuit initially in a write enable state and brought into a write inhibit state when a write inhibit selection signal is applied after application of said first data, and
      a first functional circuit performing said logical operation in accordance with said first data held by said non-volatile data holding circuit, and
   said second circuit region includes a data holding circuit holding said second data, and a second functional circuit performing said logical operation in accordance with said second data held by said data holding circuit.

3. A programmable semiconductor device, comprising:

a plurality of circuit regions arranged in an array having a function of performing a logical operation in accordance with setting data when said setting data is externally applied, each of said circuit region including a rewritable non-volatile data holding circuit initially in a write enable state and brought into a write inhibit state when a write inhibit selection signal is applied after application of said setting data; and a functional circuit performing said logical operation in accordance with said setting data held by said non-volatile data holding circuit, and wherein said write inhibit selection signal can independently be applied to each of said plurality of circuit regions.

4. The semiconductor device according to claim 3, wherein said non-volatile data holding circuit includes:

a write inhibit information circuit initially holding first data and holding second data complementary to said first data as non-volatile data when said write inhibit selection signal is applied;

a gate circuit activating an internal write selection signal in accordance with an externally applied write selection signal when said write inhibit information circuit holds said first data, and inactivating said internal write selection signal when said write inhibit information circuit holds said second data; and a circuit information holding circuit incorporating said setting data as circuit information data for said functional circuit and holding it as non-volatile data in accordance with activation of said internal write selection signal.

5. The semiconductor device according to claim 4, wherein said write inhibit information circuit includes an electrically erasable non-volatile memory.

6. The semiconductor device according to claim 4, wherein said write inhibit information circuit includes an antifuse element.

7. The semiconductor device according to claim 4, wherein said write inhibit information circuit includes a fuse element.

8. The semiconductor device according to claim 3, wherein said non-volatile data holding circuit includes:

a write inhibit information circuit initially holding first data and holding second data complementary to said first data as non-volatile data when said write inhibit selection signal is applied;

a gate circuit activating an internal read selection signal in accordance with an externally applied read selection signal when said write inhibit information circuit holds said first data, and inactivates said internal read selection signal when said write inhibit information circuit holds said second data; and a circuit information holding circuit externally outputting said setting data held by said circuit information holding circuit as circuit information data of said functional circuit in accordance with activation of said internal read selection signal.

9. The semiconductor device according to claim according to claim 8, wherein said write inhibit information circuit includes an electrically erasable non-volatile memory.

10. The semiconductor device according to claim 8, wherein said write inhibit information circuit includes an antifuse element.

11. The semiconductor device according to claim 8, wherein said write inhibit information circuit includes a fuse element.

\* \* \* \* \*